US005418279A

United States Patent [19]
Ren et al.

[11] Patent Number: 5,418,279
[45] Date of Patent: May 23, 1995

[54] STEREOREGULAR POLYSTYRENE COMPOSITIONS FOR USE IN PLASTISOLS

[75] Inventors: Jie Ren, Woodstock, Md.; William P. Roberts, Simpsonville, S.C.; Arthur D. Ketley, Silver Spring, Md.

[73] Assignee: W. R. Grace & Co.-Conn., New York, N.Y.

[21] Appl. No.: 235,005

[22] Filed: Apr. 28, 1994

[51] Int. Cl.6 ............................ C08J 3/18; C08K 5/49
[52] U.S. Cl. ................................. 524/577; 524/141; 524/143; 524/145; 524/292; 524/296; 524/297; 524/298; 524/314
[58] Field of Search ............... 524/141, 143, 296, 297, 524/314, 577, 292, 145, 298

[56] References Cited

U.S. PATENT DOCUMENTS

| | | | |
|---|---|---|---|
| 1,792,102 | 2/1931 | Lawson | 524/297 |
| 3,000,845 | 9/1961 | Doak et al. | 524/143 |
| 3,224,994 | 12/1965 | Lundberg et al. | 524/145 |
| 3,346,528 | 10/1967 | Slocombe et al. | 524/141 |
| 3,760,724 | 9/1973 | Budzinski et al. | 524/143 |
| 3,925,280 | 12/1975 | Lundberg | 524/504 |
| 4,014,847 | 3/1977 | Lundberg | 524/388 |
| 4,425,455 | 1/1984 | Turner | 524/547 |
| 4,957,955 | 9/1990 | Saur et al. | 524/297 |

Primary Examiner—Peter A. Szekely
Attorney, Agent, or Firm—Valerie E. Looper

[57] ABSTRACT

Stereoregular polystyrenes can be combined with a plasticizer to make a non-PVC plastisol with physical properties comparable to PVC-based plastisols.

18 Claims, 2 Drawing Sheets

STEREOREGULAR POLYSTYRENE COMPOSITIONS FOR USE IN PLASTISOLS

FIELD OF THE INVENTION

This application relates to non-PVC plastisols. More specifically, it relates to stereoregular polystyrenes which can be used instead of polymers made of vinyl chloride ("PVC") to make plastisols. Films made from stereoregular polystyrene plastisols can exhibit better physical properties for use in container closures than commercially available PVC plastisols.

BACKGROUND OF THE INVENTION

At present, plastisols based on PVC are widely used because they offer good technical solutions to a number of problems faced by packagers, canners and bottlers. Plastisols made with PVC are flexible and tack-free, exhibit good adhesion to metal, can be formulated as a low viscosity film, sealant layer, coating or perhaps a tray, do not add a taste or smell to a packaged food or beverage, and are relatively inexpensive to produce. On the other hand, the raw materials do contain chlorine, which has become the subject of environmental concern.

Chlorine, which is essential to life and is found in common table salt, is a highly reactive element which exerts a profound effect on molecules that contain it. Many chlorinated organic compounds are highly reactive, and many, including the vinyl chloride monomer used to make the PVC polymer, are carcinogens. Further, improper incineration of materials that contain PVC can produce hydrogen chloride (a corrosive acid) and dioxins (which are poisonous). Since many communities world-wide are incinerating municipal solid waste, there is a demand to reduce the use of PVC rather than depend upon the proper incineration of waste every time.

It can be seen, therefore, that there is a need for a non-PVC plastisol, particularly where environmental concerns exist.

Plastisols are essentially blends of finely divided thermoplastic polymers suspended in a liquid medium, or plasticizer. Plastisols are particularly useful as an aid to handling polymers which would otherwise exist in a highly viscous or semi-solid state. U.S. Pat. No. 3,925,280, issued to Lundberg et al. Dec. 9, 1975 discloses that broad classes of thermoplastic materials, including graft or block copolymers as well as various ionomers, can be powdered and then blended with plasticizers to produce a suspension which is useful for making thin layers or coatings. The suspension is simply applied to a surface of an article and heated to a softening point of the polymer. A liquid-solid transition occurs upon heating, producing a plasticized semi-rigid or elastomeric product of high strength.

In U.S. Pat. No. 4,014,847, issued to Lundberg et al. Mar. 29, 1977, it is further disclosed that certain polar plasticizers such as glycerol are compatible with various ionomers including sulfonated polystyrenes. No particular end use for the resulting suspensions is disclosed.

U.S. Pat. No. 4,425,455 issued to Turner et al. Jan. 10, 1984 discloses that sulfonated thermoplastic polymers, including copolymers of sodium styrene sulfonate with styrene, vinyl toluene or t-butyl styrene, can be blended with a polar cosolvent (plasticizer) for use in a drilling mud.

The effective use of styrene/sodium styrene sulfonate (Sty/NaSS) copolymers in plastisols has been described in copending application U.S. Ser. No. 08/208,764, our Reference 8364, "Styrene/Sodium Styrene Sulfonate Copolymer for Plastisol Sealant".

Atactic polystyrene is known for use in plastisols, but, as discussed in the comparative example below, the resulting physical properties are not usable in the present application. It is difficult to plasticize atactic polystyrene with the object of producing thermo-deformation resistant tack-free films. Simple ester type plasticizers, even those which are compatible with polystyrene, do not produce an increase in flexibility. It is only after sufficient plasticizer has been added to reach a certain "threshold concentration" before flexibility is attained and at which point a highly extensible, tacky composition results. The plasticized polystyrenes have no physical strength and thermodeformation resistance.

The materials of this invention are comprised of stereoregular polystyrenes prepared by metallocene/Ziegler Natta polymerization. Combining these stereoregular polystyrenes with various amounts of plasticizers with high aromaticity, a range of desirable physical properties such as elasticity, flexibility and thermodeformation resistance are obtained.

OBJECTS OF THE INVENTION

It is an object of the present invention to produce a non-PVC plastisol suitable for use as a tack-free film or coating.

It is a further object of this invention to create polystyrene plastisols with desirable elasticity, flexibility and thermodeformation resistance to replace polyvinyl chloride where chlorine is an environmental concern.

These and other objects and advantages of the invention can be accomplished using stereoregular polystyrene in plastisols. The presently described materials exhibit better elasticity, flexibility and thermodeformation resistance than commercial polyvinyl chloride plastisols.

DETAILED DESCRIPTION OF THE INVENTION

Plastisols are useful as a means of handling polymers which are highly viscous and may be sensitive to heat. Processes utilizing plastisols can function as an alternative to other methods which employ massive machinery to extrude, mold or calender the highly viscous molten polymer. The plastisol is a suspension having a solids content of about 15–75 weight % of finely divided polymer in a compatible plasticizer. Polymer particle size is preferably about 10 to 50 microns in diameter. It is desirable that the suspension has a reasonable degree of shelf stability. That is, no substantial change in viscosity or physical appearance should occur at ambient temperature over a period of hours or days, depending on the application. The suspension can easily be coated or flowed onto an object and heated to induce a liquid-solid transition due to plasticization of the polymer. Upon cooling, the product is a plasticized semirigid or elastomeric product of high strength.

Stereoregular Polystyrene

Styrene can be made in three forms: atactic or irregular, isotactic with the aromatic groups aligned on one side of the polymer backbone, and syndiotactic, where the aromatic groups are on regularly alternate sides of the polymer backbone. As shown in the comparative example below, the atactic polystyrene is unsuitable for the inventors' purposes.

On the other hand, both isotactic and syndiotactic forms of polystyrene can be used to make plastisol sealants. If the isotactic material is used, the polystyrene should be at least about 50% isotactic, preferably about 80–95% isotactic, and have a weight average molecular weight of 50,000 to 1,000,000, preferably 200,000 to 1,000,000, measured using GPC polystyrene standards. If the syndiotactic form is used, the polystyrene should be 35–75%, and preferably 20–50% syndiotactic. The weight average molecular weight range is about 10,000–200,000, preferably 50,000–150,000, measured using GPC polystyrene standards. Percent stereoregularity can be controlled both by the manufacturing process and by blending. For example, 90% isotactic polystyrene is commercially available, and plastisols can be made by blending the isotactic material with an atactic material to lower the level of stereoregularity.

Such polymers are prepared using metallocene, heterogenous, or mixed catalysts made of aluminum alkyls, zirconium chlorides and titanium chlorides, and some are commercially available in various molecular weight ranges from, for example, Scientific Polymer Products, Inc., Ontario, N.Y.

The Plasticizers

Operable plasticizers include most of those commonly used for PVC plastisols. They include alkyl phthalates, isophthalates and terephthalates, especially di-2-ethylhexyl phthalate (commonly called dioctyl phthalate), diisononyl phthalate and other alkyl phthalates having alkyl groups of 2–20 carbons, especially 7–12 carbons, either branched or unbranched, and mixtures thereof. Also included are alkyl aryl phthalates such as butyl benzyl phthalate. Other operable classes of plasticizers are dialkyl adipates, dialkyl glutarates, dialkyl azelates, dialkyl sebacates and trialkyl trimellitates, where alkyl groups are as defined as above for the phthalates. Also operable are polyether or polyester dibenzoates such as polyethylene glycol 200 dibenzoate. Another class of operable plasticizers are the citrates, as exemplified by tributyl citrate and acetyl tributyl citrate. Another class of plasticizers are the phosphate esters such as tricresyl phosphate, isopropylated triphenyl phosphate and mixtures thereof. Other operable plasticizers include epoxidized natural products such as epoxidized soybean oil and epoxidized 2-ethylhexyl tallate. Another operable plasticizer is N-ethyltoluenesulfonamide. Many other plasticizers not explicitly mentioned above are also believed to be operable. Highly aromatic plasticizers are preferred. The most preferred plasticizers are blends of tricresyl-phosphate (TCP) and a mixture of triisopropylphenyl and triphenylphosphate. The mixture is commercially available as PLIABRAC plasticizer from Solvay Minerals, Inc., Houston, Tex. This particular mixture also has the useful property of acting as a flame retardant when formulated into a plastisol.

The following Examples serve to illustrate the invention without limiting its scope or the scope of the claims which follow.

COMPARATIVE EXAMPLE WITH ATACTIC POLYSTYRENE

An atactic polystyrene homopolymer powder (TYREZ DL-2763 from Reichhold Chemical Company, Research Triangle Park, N.C.) was mixed with an equal weight of dioctyl phthalate plasticizer to form a mobile white paste. After standing 1 hour at room temperature, the paste had increased in viscosity, and after 2 hours it had the consistency of a gum. When it was fused at 180° C. for 40 minutes, it became a weak, easily deformable, rubbery solid that would be unsuitable as a sealant. Similar results were obtained using diisononyl phthalate, and also a blend of TCP and PIABRAC plasticizers.

EXAMPLE 1

50 Parts (by weight) polystyrene, 90% isotactic (Scientific Polymer Products, Inc., MW 400,000) were ground using laboratory mills and were mixed with 18 parts tricresyl phosphate (TCP) (Scientific Polymer Products, Inc.), 30 parts PLIABRAC 519 (Solvay). The above polymer composition was fluxed to a clear film over a 200° C. hot plate in less than 20 minutes. The resulting polystyrene film was tough and elastomeric.

80 Parts (by weight) polyvinyl chloride (Scientific Polymer Products, Inc., MW 275,000) were ground using laboratory mills and were mixed with 20 parts diisononyl phthalate (Scientific Polymer Products, Inc.). This polyvinyl chloride plastisol composition was fluxed to a clear film over a 200° C. hot plate in less than 20 minutes. The resulting polyvinyl chloride film was tough and elastomeric.

Figure 1:
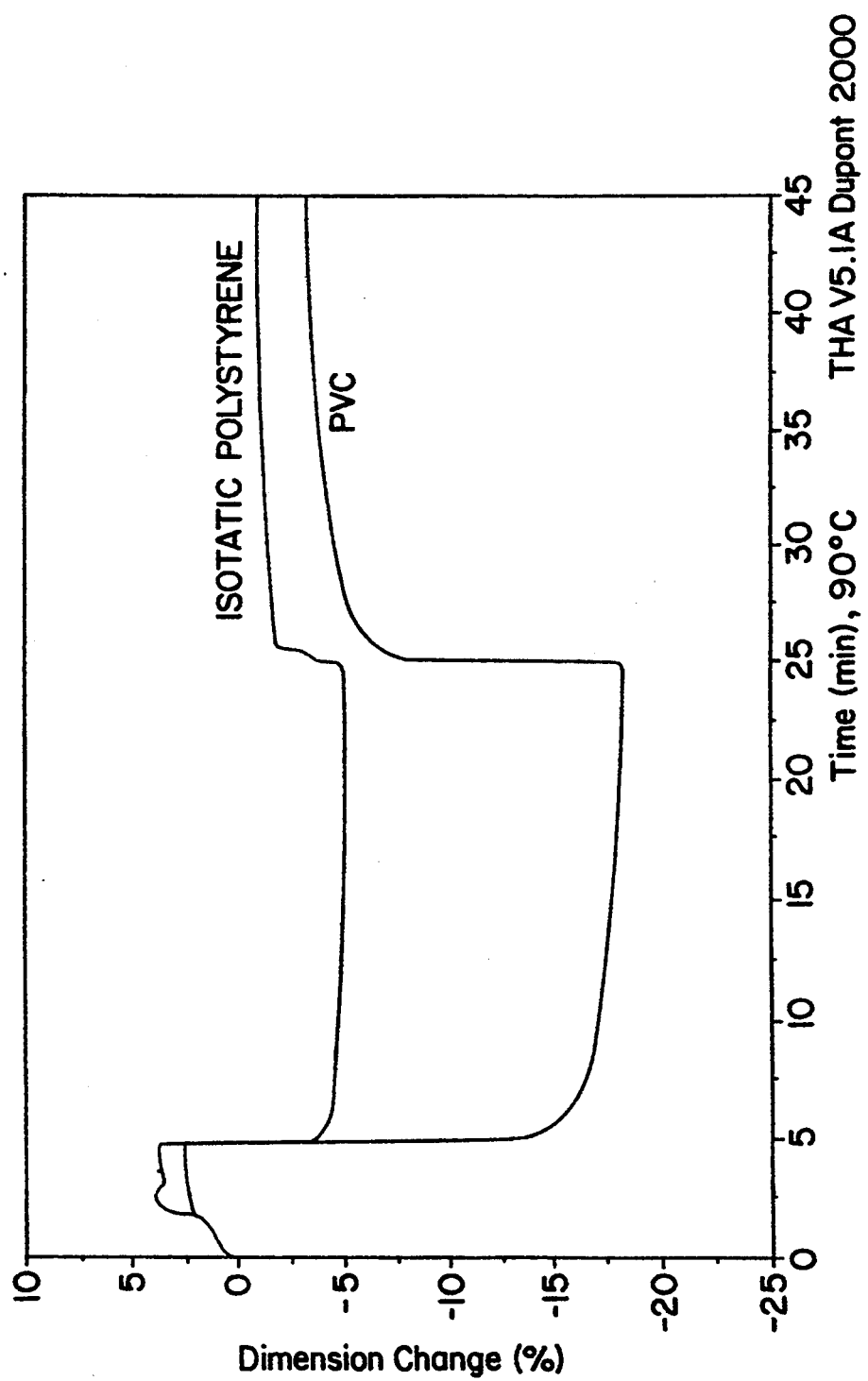
FIGS. 1 and 2 are graphs of a comparative thermomechanical analysis of isotactic polystyrene plastisol films and polyvinyl chloride plastisol films.
Figure 2:
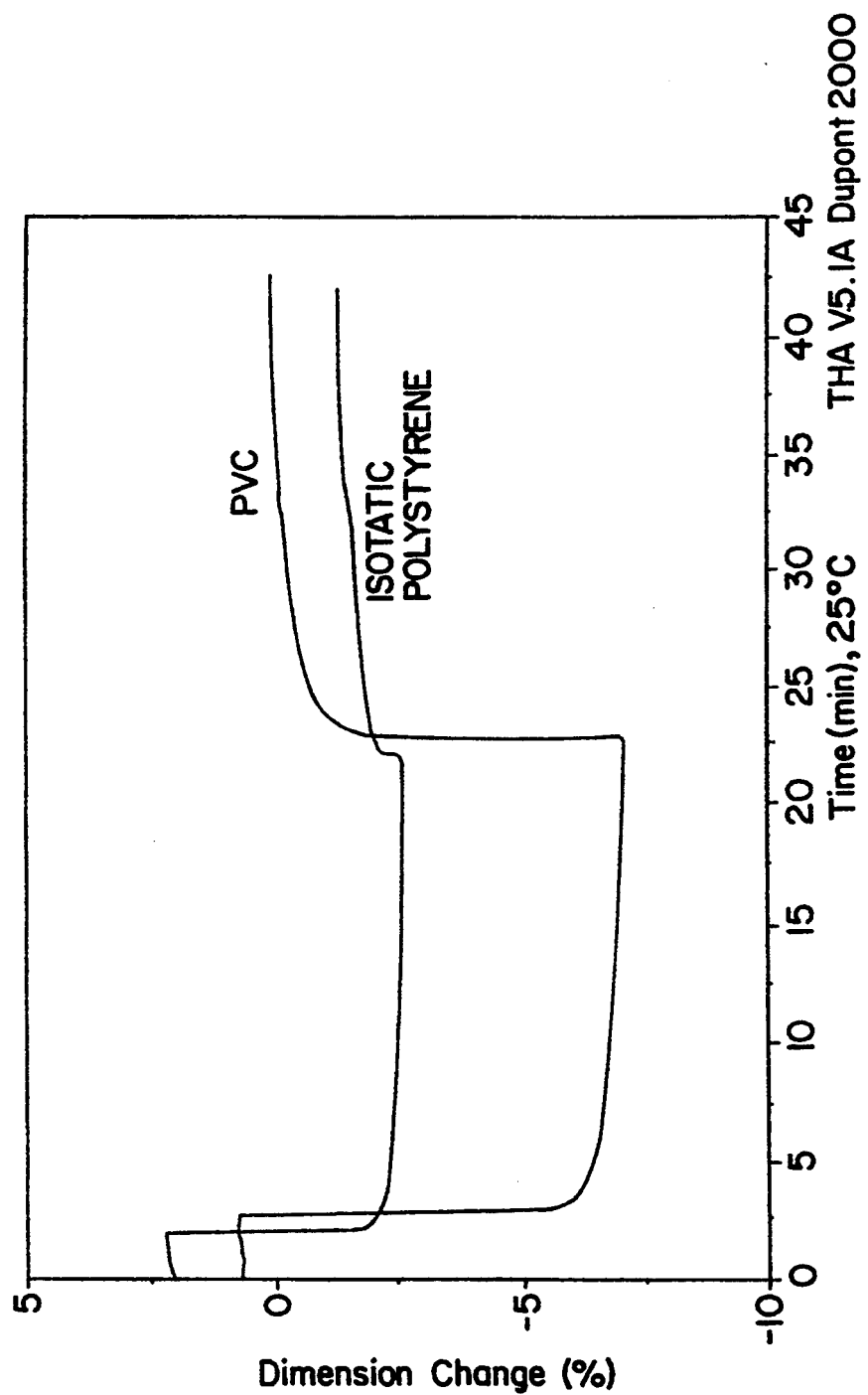

The compression set and recovery of the above films are depicted in FIGS. 1 and 2 (ref. ASTM D395-89 and ASTM F26-88) measured by Thermomechanical Analyzer (TMA2940, from TA Instruments). A force of about 0.5N was applied at about 5 minutes and removed at about 25 minutes. The polystyrene sample shows significant elastic recovery, especially at 90° C.

EXAMPLE 2

100 Parts (by weight) polystyrene, 90% isotactic (Scientific Polymer Products, Inc., MW 400,000) were ground using laboratory mills and were mixed with 25 parts tricresyl phosphate (Scientific Polymer Products, Inc., Ontario, N.Y.), 60 parts of ditridecyl phthalate (Scientific Polymer Products, Inc.). The above polymer composition was fluxed to a clear film over a 200° C. hot plate in less than 20 minutes. The resulting polystyrene film was tough and elastomeric.

EXAMPLE 3

In an argon atmosphere glove box, a glass reactor was charged with 200 mL purified anhydrous toluene, 30 mL highly purified anhydrous styrene monomer, and 10 mL methylaluminoxane (Ethyl Corporation, Richmond, Va.). After stirring approximately 2 minutes, 20 mg cyclopentadienyl zirconium trichloride in toluene solution was added to the reactor and was allowed to proceed for 2 hours. The reactor was sealed and taken out of the glovebox. The reactor contents were hydrolyzed by the addition of 20 mL methanol and were then precipitated in 100 mL 5% acidic methanol solution. The resulting 60% syndiotactic polystyrene was collected by filtration, washed with methanol and vacuum dried at 80° C. for 36 hours.

60 Parts (by weight) syndiotactic polystyrene prepared as described above were ground using laboratory mills and were mixed with 40 parts di-(2-ethylhexyl)phthalate (Scientific Polymer Products), 1 part of ditridecyl adipate (Scientific) and 1 part of tricresyl phosphate (Scientific).

The above polymer composition was fluxed to a clear film over a 200° C. hot plate in less than 20 minutes. The resulting film was tough and elastomeric.

What is claimed:

1. A non-PVC plastisol made of a stereoregular polystyrene, having a particle size of 10-50 microns and a weight average molecular weight of 10,000 to 1,000,000 and about 25-85% by weight of a plasticizer.

2. The plastisol of claim 1, wherein the polystyrene is about 75%-100% isotactic.

3. The plastisol of claim 1, wherein the polystyrene is about 80-95% isotactic.

4. The plastisol of claim 1, wherein the polystyrene is about 20%-75% syndiotactic.

5. The plastisol of claim 1, wherein the polystyrene is about 35%-50% syndiotactic.

6. The plastisol of claim 2 or 3, wherein the polystyrene has a weight average molecular weight of about 200,000 to 1,000,000.

7. The plastisol of claim 4 or 5 wherein the polystyrene has a weight average molecular weight of about 10,000 to 200,000.

8. The plastisol of claim 1, wherein the plasticizer is selected from the group consisting of alkyl phthalates, alkyl-aryl phthalates, isophthalates, terephthalates, phosphate esters, adipates and blends thereof.

9. The plastisol of claim 8, wherein the plasticizer is selected from the group consisting of tricresylphosphate, triisopropylphenyl phosphate, triphenyl phosphate, di-(2-ethylhexyl)phthalate, ditridecyl adipate and blends thereof.

10. A process for making a plastisol, the steps comprising blending 15-75 weight percent of a stereoregular polystyrene having a particle size of 10-50 microns and a weight average molecular weight of 10,000 to 1,000,000, with a plasticizer.

11. The process of claim 10, wherein the polystyrene is about 75%-100% isotactic.

12. The process of claim 10, wherein the polystyrene is about 80%-95% isotactic.

13. The process of claim 10, wherein the polystyrene is about 20%-75% syndiotactic.

14. The process of claim 10, wherein the polystyrene is about 35%-50% syndiotactic.

15. The process of claim 11 or 12, wherein the polystyrene has a weight average molecular weight 200,000 to 1,000,000.

16. The process of claim 13 or 14, wherein the polystyrene has a weight average molecular weight of 10,000 to 200,000.

17. The process of claim 10, wherein the plasticizer is selected from the group consisting of alkyl phthalates, alkyl-aryl phthalates, isophthalates, terephthalates, phosphate esters, adipates and blends thereof.

18. The process of claim 10, wherein the plasticizer is selected from the group consisting of tricresylphosphate, triisopropylphenyl phosphate, triphenyl phosphate, di-(2-ethylhexyl)phthalate, ditridecyl adipate and blends thereof.

* * * * *